UNITED STATES PATENT OFFICE.

LAZAR ROSENFELD, OF VIENNA, AUSTRIA-HUNGARY.

DUST-ABSORBENT.

SPECIFICATION forming part of Letters Patent No. 678,981, dated July 23, 1901.

Application filed January 8, 1901. Serial No. 42,563. (Specimens.)

*To all whom it may concern:*

Be it known that I, LAZAR ROSENFELD, physician and doctor of medicine, a subject of the Emperor of Austria-Hungary, residing at 170 Schönbrunnerstrasse, in the city of Vienna, in the Empire of Austria-Hungary, have invented a certain new and useful Dust-Absorbent, of which the following is a specification.

This invention has reference to a dust-absorbing medium which when strewn upon the floor or upon a pavement of any kind will allow the sweeping to be done without having the dust fly all around, as the new composition of matter readily absorbs all particles of dust and prevents their spreading.

My improved dust-absorbent is prepared as follows: Oils or fats, both animal and vegetable, as well as mineral oils—the so-called "Vulcan" oil, for instance—are intimately mixed with cement or similar material and with pulverulent or powdered bituminous substances, earths, or the like. To the resulting uniform heavy unctuous powder I may add suitable disinfectants or any odorous substances that are not a danger to health. The material thus prepared will readily absorb moisture and saturate itself with the particles of dust, so as to make it possible to sweep floors upon which this powder has been strewn entirely dry and without inconvenience.

What I claim, and desire to secure by Letters Patent of the United States, is—

1. A dust-absorbent comprising a mixture of any suitable oily or fatty material with a mineral binder and bituminous earth.

2. A dust-absorbent comprising any suitable fatty or oily material in admixture with cement and bituminous earth and with disinfectant and odorous substances, substantially as described.

In witness whereof I have hereunto set my hand in presence of two witnesses.

LAZAR ROSENFELD.

Witnesses:
C. B. HUNT,
ALVESTO S. HOGUE.